United States Patent
Jang et al.

(10) Patent No.: US 8,868,305 B2
(45) Date of Patent: Oct. 21, 2014

(54) APPARATUS FOR PARKING CONTROL OF AUTOMATIC TRANSMISSION VEHICLE AND METHOD THEREOF

(75) Inventors: Wookjin Jang, Yongin (KR); Jaeweon Jun, Hwaseong-si (KR); Kunsoo Jung, Hwaseong (KR); Chang Kook Chae, Suwon-si (KR); Jae Joon Seo, Anyang-si (KR); Wan Soo Oh, Ulsan-si (KR); Jae Woong Hwang, Yongin-si (KR); Ho Rim Yang, Suwon-si (KR); Jin Hee Lee, Hwasung-si (KR); Jin Soo Lee, Suwon (KR); Woochurl Son, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 163 days.

(21) Appl. No.: 13/306,699

(22) Filed: Nov. 29, 2011

(65) Prior Publication Data

US 2012/0136543 A1    May 31, 2012

(30) Foreign Application Priority Data

Nov. 30, 2010   (KR) .................. 10-2010-0120932

(51) Int. Cl.
  *F16H 61/00*  (2006.01)
  *F16H 63/48*  (2006.01)
  *F16H 59/44*  (2006.01)
  *F16H 59/66*  (2006.01)

(52) U.S. Cl.
  CPC ............... *F16H 63/48* (2013.01); *F16H 59/44* (2013.01); *F16H 2059/663* (2013.01); *F16H 61/0059* (2013.01)
  USPC ................................................ 701/53; 701/1

(58) Field of Classification Search
  USPC ........... 701/51, 54, 67, 70; 475/119, 198, 900
  See application file for complete search history.

(56) References Cited

U.S. PATENT DOCUMENTS

| | | | | |
|---|---|---|---|---|
| 3,707,891 A | * | 1/1973 | Asano et al. | 477/117 |
| 4,335,428 A | * | 6/1982 | Miki et al. | 701/65 |
| 4,354,236 A | * | 10/1982 | Miki et al. | 701/66 |
| 4,558,612 A | * | 12/1985 | Shimizu et al. | 477/97 |
| 4,658,676 A | * | 4/1987 | Furusawa et al. | 477/125 |
| 4,718,311 A | * | 1/1988 | Hayakawa et al. | 477/125 |
| 5,272,630 A | * | 12/1993 | Brown et al. | 701/68 |
| 5,887,670 A | * | 3/1999 | Tabata et al. | 180/65.25 |
| 6,022,288 A | * | 2/2000 | Cho | 475/276 |
| 6,287,236 B1 | * | 9/2001 | Ishikawa | 477/71 |
| 6,346,064 B1 | * | 2/2002 | Hada et al. | 477/171 |
| 2001/0053728 A1 | * | 12/2001 | Kim et al. | 475/119 |

(Continued)

FOREIGN PATENT DOCUMENTS

JP    2009-236299 A    10/2009

*Primary Examiner* — Ian Jen
(74) *Attorney, Agent, or Firm* — Morgan, Lewis & Bockius LLP (57) ABSTRACT

An apparatus for parking control of an automatic transmission vehicle may include a speed detector that provides a controller with a vehicle speed, a shift lever detector that provides the controller with a position of a shift lever, the controller that analyses the vehicle speed and the position of the shift lever, and supplies a predetermined hydraulic pressure to brake elements and clutch elements in order to create drag on a parking gear shaft in conversion into a parking mode, and an actuator that supplies the hydraulic pressure to the clutch elements and the brake elements or discharges the hydraulic pressure from the clutch elements and the brake elements according to the control of the controller.

5 Claims, 7 Drawing Sheets

(56) References Cited

U.S. PATENT DOCUMENTS

| | | | |
|---|---|---|---|
| 2002/0103055 A1* | 8/2002 | Tani et al. | 477/115 |
| 2006/0252593 A1* | 11/2006 | Inoue et al. | 475/116 |
| 2007/0225115 A1* | 9/2007 | Nakajima et al. | 477/107 |
| 2008/0015778 A1* | 1/2008 | Matsuura et al. | 701/301 |
| 2008/0076629 A1* | 3/2008 | Sugai et al. | 477/15 |
| 2009/0312926 A1* | 12/2009 | MacFarlane et al. | 701/59 |

\* cited by examiner

APPARATUS FOR PARKING CONTROL OF AUTOMATIC TRANSMISSION VEHICLE AND METHOD THEREOF

CROSS-REFERENCE TO RELATED APPLICATION

The present application claims priority to Korean Patent Application No. 10-2010-0120932 filed in the Korean Intellectual Property Office on Nov. 30, 2010, the entire contents of which is incorporated herein for all purposes by this reference.

BACKGROUND OF THE INVENTION

1. Field of the Invention

The present invention relates to an automatic transmission. More particularly, the present invention relates to a control apparatus for an automatic transmission and a control method that minimizes distortion of a drive shaft that is generated by thrust of a vehicle when parking on a sloped road.

2. Description of Related Art

When a vehicle that has an automatic transmission is parked, the shift lever is located in a parking mode (P range).

Figure 5:
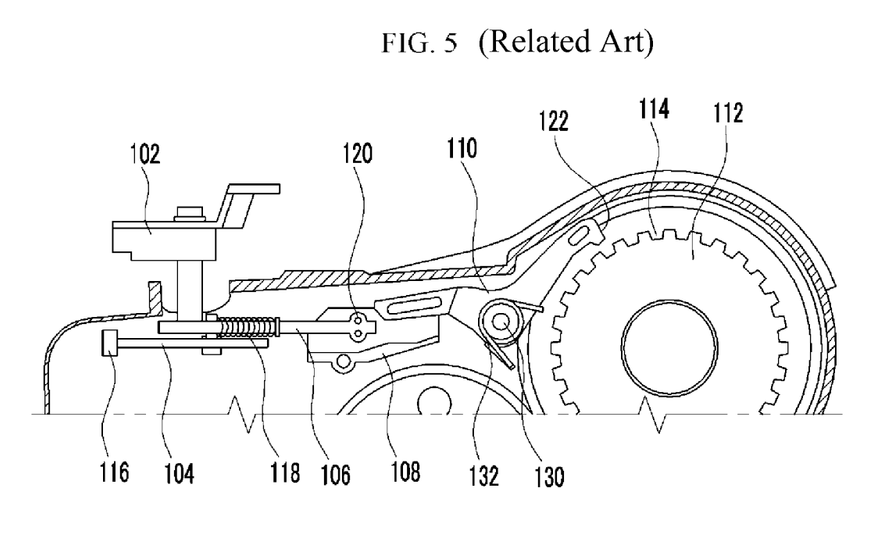
FIG. 5 is a cross-sectional view of a parking apparatus applied to an automatic transmission of a related art.

FIG. 5 is a cross-sectional view of parking apparatus that is applied to an automatic transmission.

Referring to FIG. 5, a parking apparatus of an automatic transmission includes a detent lever 104 that rotates as a shift lever 102 selects a parking mode, a parking rod 106 that is connected to a side of the detent lever 104 and moves in a straight line according to a rotation of the detent lever 104, a parking pawl lever 110 that is rotatably mounted at a support bracket 108 and rotates when the parking rod 106 moves in a straight line, and a parking gear 112 that is installed in a planetary gear set of the automatic transmission and on which latch grooves 114 are formed in the outer circumferential surface at regular intervals so that the parking pawl lever 110 may be combined thereto.

A detent spring 116, which blocks the detent lever 104 during rotation of the detent lever 104, is formed at a side of the detent lever 104, a rod spring 118 that provides elastic force is mounted on the parking rod 106, and a roller 120 that pushes up the parking pawl lever 110 when the parking rod 106 moves in a straight line is mounted at an end portion of the parking rod 116.

In the middle of the parking pawl lever 110, a hinge connection portion 130 that is rotatably supported in the automatic transmission is formed, and a return spring 132 that reinstates a parking sprag is formed at the hinge connection portion 130.

A sloped surface that contacts the roller 120 is formed at an end portion of the parking pawl lever 110, and an engagement protrusion 122 that is engaged with the latch groove 114 of the parking gear 112 is formed at the other end portion of the parking pawl lever 110.

In a parking apparatus of an automatic transmission that is formed in this way, when a driver places the shift lever 102 in the parking mode, the detent lever 104 rotates, the parking rod 106 connected with the detent lever 104 moves in a straight line, and the roller 120 mounted at the end portion of the parking rod 106 enters into the slanted surface of the parking pawl lever 110 to push up an end portion of the parking pawl lever 110.

Then, the engagement protrusion 122 formed at the end portion of the parking pawl lever 110 moves downward and is combined with the latch groove 114 of the parking gear 112 to fix the parking gear 112 and maintained the parked state.

Also, when the shift lever 102 moves from the parking position to another position, the parking rod 106 is reinstated by the rod spring 118 and the parking pawl lever 110 is reinstated by elastic force of the return spring 132 so that the engagement protrusion 122 cannot be engaged and restricts the parked state.

When a driver operates an automatic transmission vehicle, the driver often parks the vehicle on a sloped road. If the shift lever is placed in the parking mode after the vehicle is parked on the sloped road, the vehicle is thrust backward or forward by the weight of the vehicle.

For example, if a rear-wheel drive vehicle parked on the slope road is thrust backward, torque is exerted on the wheel by the weight of vehicle so that the parking gear, a drive shaft, and a wheel drive shaft are sequentially distorted and energy is accumulated.

Therefore, the stress on each of the elements is dispersed and the elements are deformed by the accumulated energy, so the durability is deteriorated.

Also, when the shift lever is released from the parking mode (P range), to run in the energy-accumulated state by the sequential distortions, the accumulated energy is released and that increases the distortion vibration of the driving system, and serious impact and vibration are generated in a torque rear differential such that much noise is transferred into the vehicle through the vehicle body such that the product quality is deteriorated.

Figure 6:
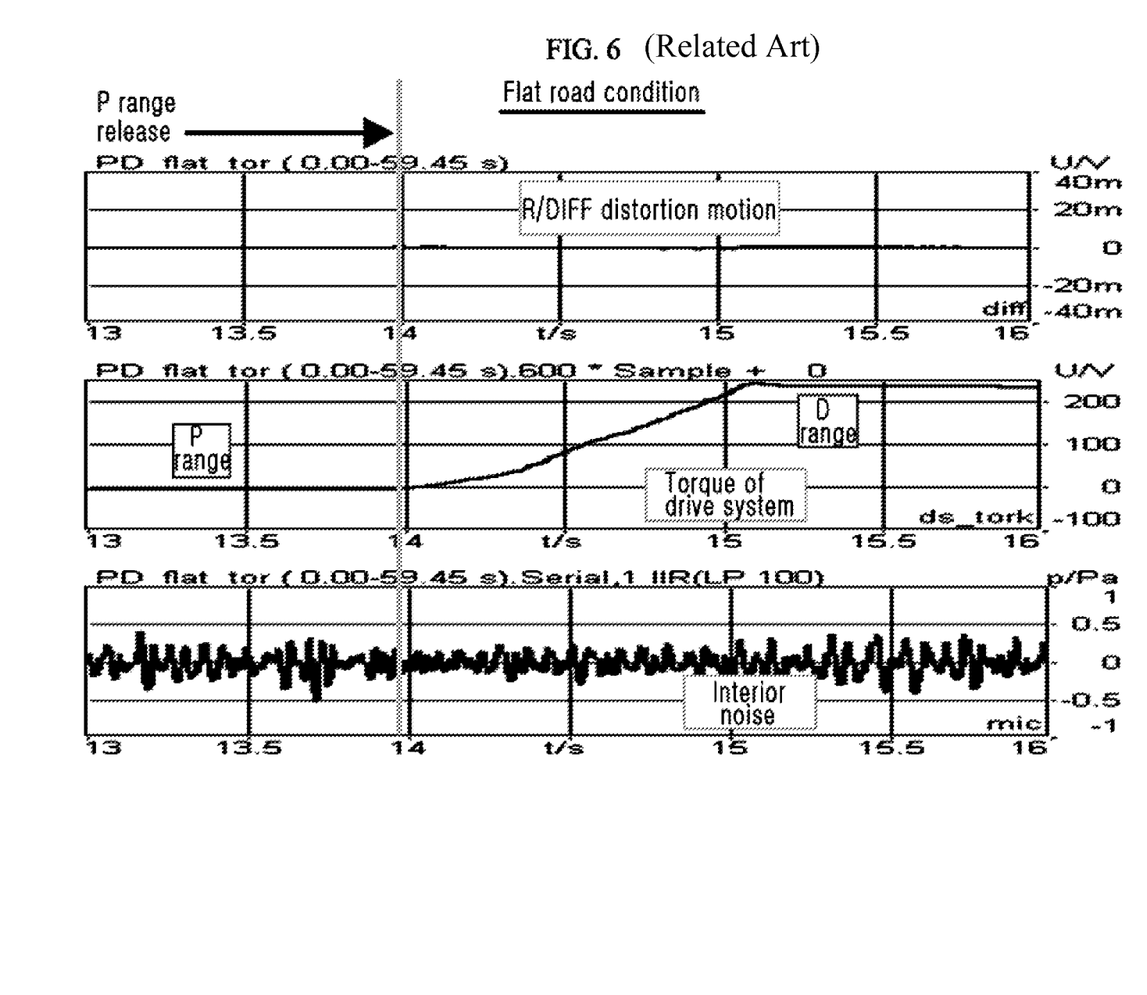
FIG. 6 shows characteristics of a conventional automatic transmission vehicle that are generated in releasing a parking mode on a flat road.
Figure 7:
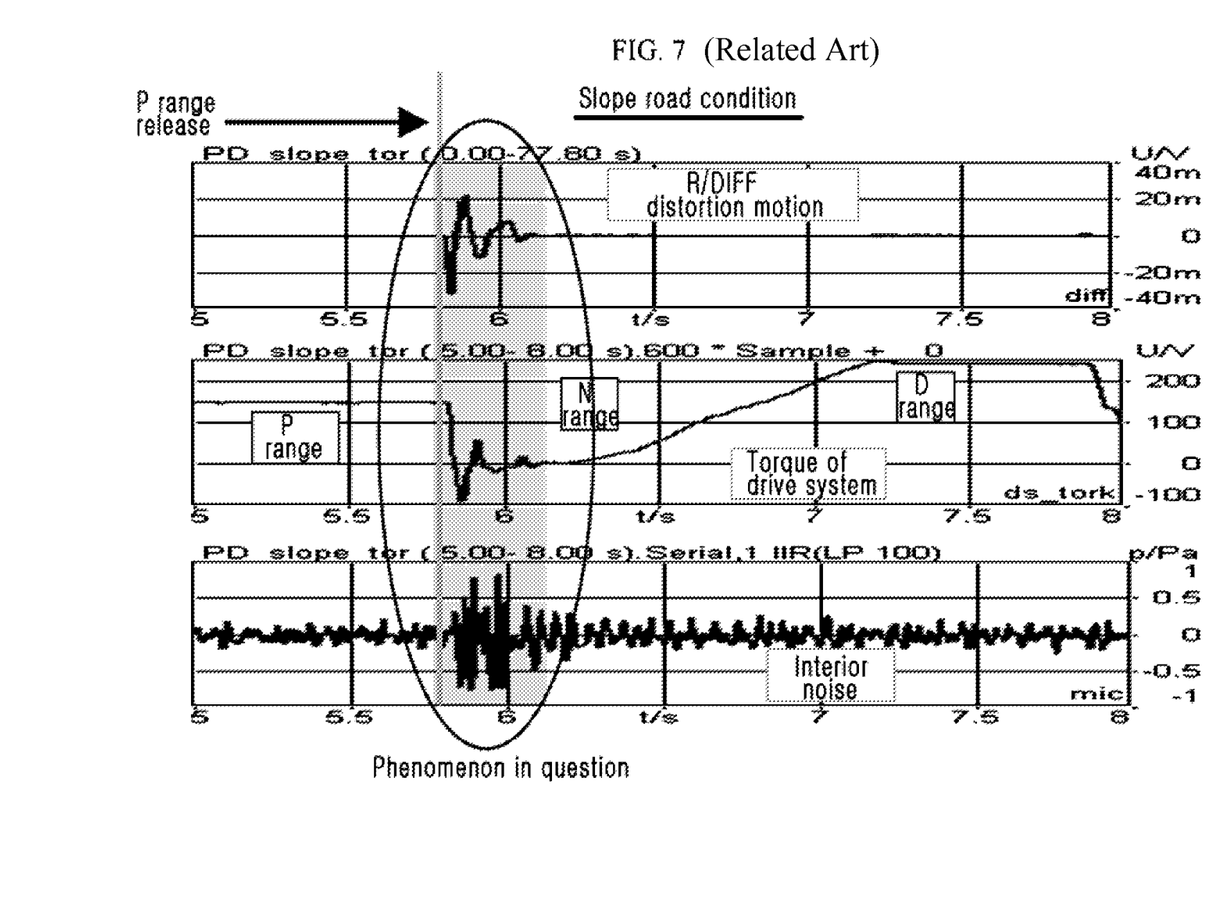
FIG. 7 shows characteristics of a conventional automatic transmission vehicle that are generated in releasing a parking mode on a sloped road.

As shown in FIG. 6, experiments show that when the parking mode is released in the parked state on flat road, any special impact, vibration or noise is not generated. However, FIG. 7 shows that when the parked state on the sloped road is released, substantial distortion motion of the rear differential, torque vibration of the driving system, and interior noise are created.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an apparatus for parking control of an automatic transmission vehicle and a method thereof having advantages of minimizing energy accumulation of a drive shaft generated by thrust of a vehicle by generating drag on a parking gear shaft by supplying predetermined hydraulic pressure to clutch elements and brake elements when a parking mode of a shift lever is detected.

In an aspect of the present invention, the apparatus for parking control of an automatic transmission vehicle may include a speed detector that provides a controller with a vehicle speed, a shift lever detector that provides the controller with a position of a shift lever, the controller that analyses the vehicle speed and the position of the shift lever, and supplies a predetermined hydraulic pressure to brake elements and clutch elements in order to create drag on a parking gear shaft in conversion into a parking mode, and an actuator that supplies the hydraulic pressure to the clutch elements and the brake elements or discharges the hydraulic pressure from the clutch elements and the brake elements according to the control of the controller.

The apparatus may further include a slope degree detector that provides the controller with a degree of slope of a road.

The controller analyses the degree of slope and supplies a predetermined hydraulic pressure to the brake elements and the clutch elements in case of parking mode conversion on a sloped road such that drag is generated on a parking gear shaft.

The controller supplies the predetermined hydraulic pressure to the brake elements and the clutch elements when the degree of slope is larger than a predetermined value.

The controller determines the hydraulic pressures of the clutch elements and brake elements that minimize interior noise when releasing the parking mode by applying drag map table information determined according to the degree of slope.

In another aspect of the present invention, a parking control method of an automatic transmission may include detecting drive information including a vehicle speed and a position of a shift lever, preventing distortion of a drive shaft by generating drag on a parking gear shaft when the drive information shows a parking mode conversion, and releasing the drag generation of the parking gear shaft and combining a selected shift speed after a parking mode is released.

The drive information may further include a degree of slope, and the distortion of the drive shaft is prevented by generating drag on the parking gear shaft in the parking mode conversion on a sloped road when the degree of slope is larger than a predetermined value.

The drag generation of the parking gear shaft is controlled by supplying a predetermined hydraulic pressure that is determined according to the degree of slope to clutch elements and brake elements.

The hydraulic pressure is turned into a value to minimize torque according to a transmission when releasing the parking mode.

According to an exemplary embodiment of the present invention, when a vehicle is parked on a sloped road, durability can be enhanced by minimizing distortion of a drive shaft generated by thrust of the vehicle, and further preventing each element transferring power from being deformed.

Also, energy accumulated on the drive shaft while being parked on a sloped road is minimized so that vibration and noise is not created when releasing parking, and further the product quality of the vehicle is improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

With reference to the accompanying drawings, the present invention will now be described in order for those skilled in the art to be able to implement it.

As those skilled in the art would realize, the described embodiments may be modified in various different ways, all without departing from the spirit or scope of the present invention. Accordingly, the drawings and description are to be regarded as illustrative in nature and not restrictive.

Figure 1:
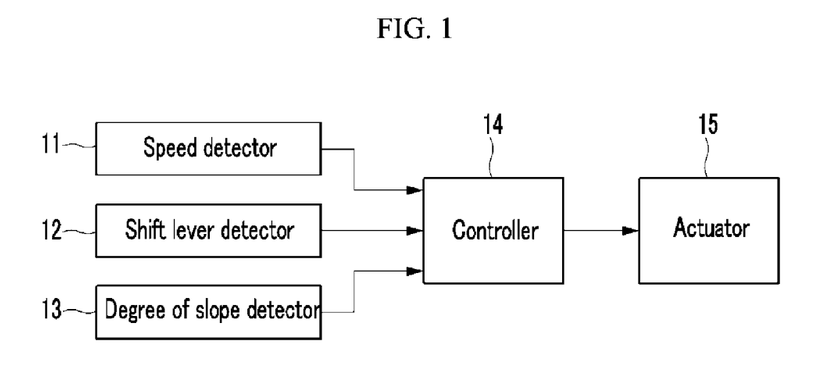
FIG. 1 schematically shows an apparatus for parking control of an automatic transmission according to an exemplary embodiment of the present invention.

FIG. 1 schematically shows an apparatus for parking control of an automatic transmission according to an exemplary embodiment of the present invention.

Referring to FIG. 1, the apparatus according to an exemplary embodiment of the present invention includes a speed detector 11, a shift lever detector 12, a slope degree detector 13, a controller 14, and an actuator 15.

The speed detector 11 detects vehicle speed from the output shaft rotation speed of the transmission, and provides the controller 14 with the information.

The shift lever detector 12 includes an inhibitor switch that detects the position of the shift lever that a driver selects, and provides the controller 14 with the information.

The slope degree detector 13 detects the degree of slope of the road, and provides the controller 14 with the information.

The controller 14 analyses the vehicle speed, the position of the shift lever, and the degree of slope, and then judges whether the position of the shift lever is moved to the parking mode in order to park or stop on a sloped road. If the shift lever is moved to the parking mode, the actuator 15 supplies predetermined hydraulic pressure to brake elements and clutch elements, so that drag can be generated on the parking gear shaft.

Therefore, distortion of the drive shaft that is generated by the thrust of the vehicle can be minimized, and deformation of each element that transfers power can be prevented.

Also, energy accumulated in the drive shaft in the parking state on a sloped road is minimized such that vibration and noise are not created when releasing the parking mode.

The controller 14 determines the hydraulic pressures of the clutch elements and brake elements that minimize interior noise when releasing the parking mode by applying pressures determined according to the degree of slope from a drag map table.

The drag map table values determined in the controller 14 can be determined as in Table 1 below.

TABLE 1

|  | C1 | C2 | B1 | B2 | Parking release torque amplitude |
| --- | --- | --- | --- | --- | --- |
| Case 1 | O | X | O | X | 59 Nm (46% ↓) |
| Case 2 | O | X | X | O | 88 Nm (20% ↓) |
| Case 3 | X | O | O | X | 91 Nm (17% ↓) |
| Case 4 | X | O | X | O | 102 Nm (7% ↓) |

In the above Table 1, C1 and C2 are clutch elements, and B1 and B2 are brake elements.

Also, the controller 14 releases hydraulic pressure supplied to the brake elements and clutch elements and generating drag on the parking gear shaft in case of detecting parking mode release of the shift lever, so that normal driving can be stably maintained.

The actuator 15 is a solenoid valve, and it is operated according to the control of the controller 14 that supplies hydraulic pressure to the clutch elements and brake elements or discharges the hydraulic pressure from the clutch elements and brake elements.

Figure 2:
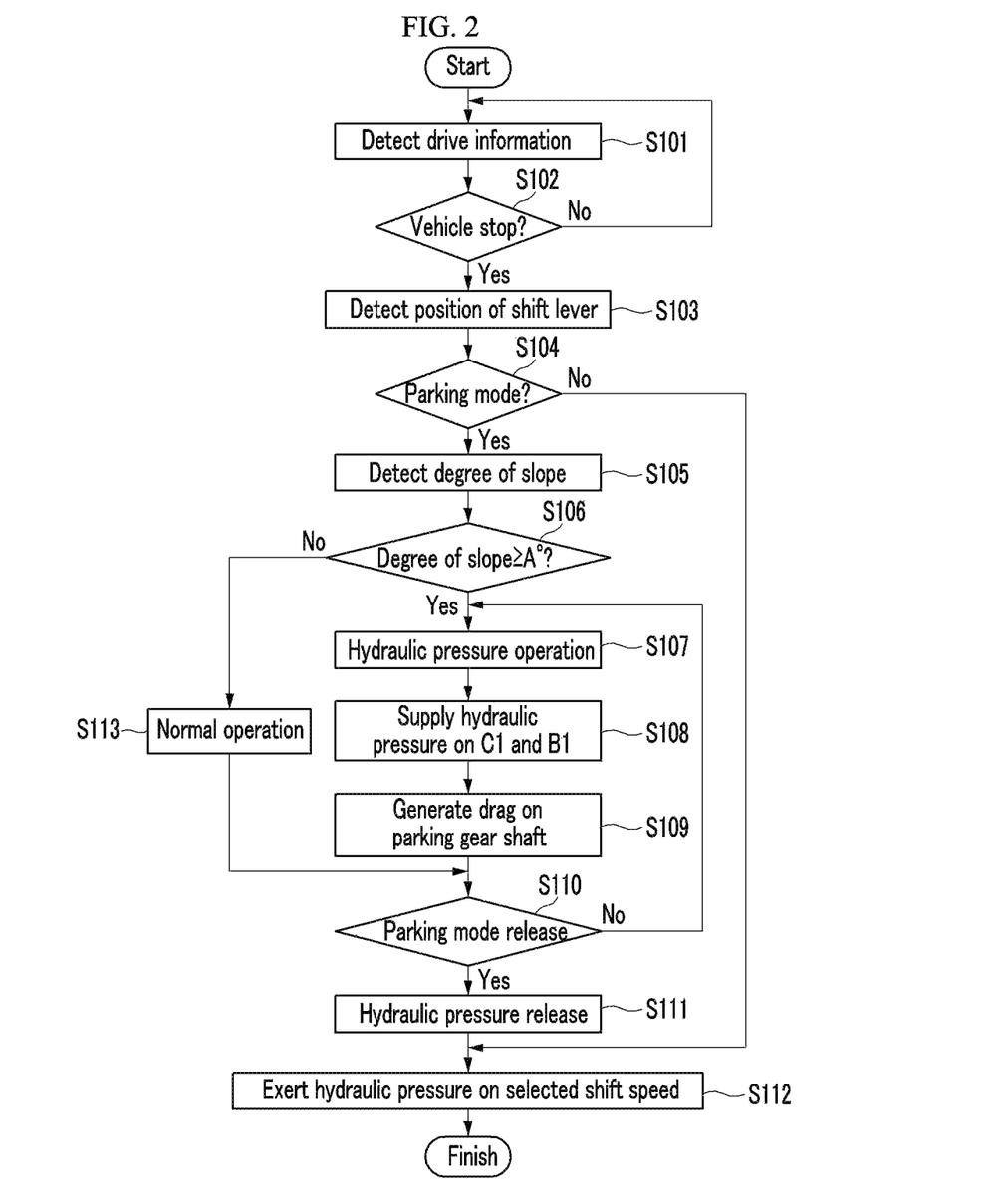
FIG. 2 is a flowchart showing parking control sequences of an automatic transmission according to an exemplary embodiment of the present invention.
Figure 3:
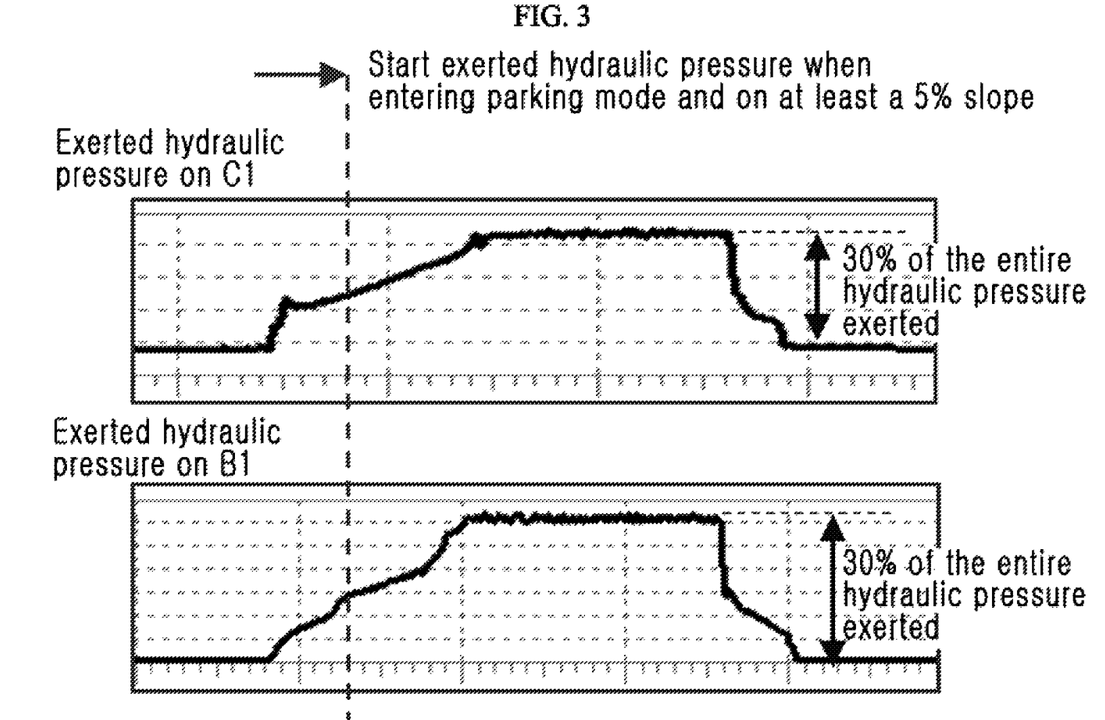
FIG. 3 shows hydraulic pressure control of an automatic transmission in a parking mode according to an exemplary embodiment of the present invention.

Referring to FIG. 2, parking control motion of an automatic transmission including the above functions according to an exemplary embodiment of the present invention is fulfilled as follows.

The controller 14 detects information provided from the speed detector 11 (S101) and judges whether the vehicle stops (S102) when the vehicle operates.

If the vehicle stops in step S102, the controller detects the position of the shift lever provided from the shift lever detector 12 (S103) and determines whether the shift lever 102 is in the parking mode (S104).

If the shift lever is in the parking mode in step S104, the controller 14 detects the degree of slope provided from the degree of slope detector 13 (S105), and determines whether the degree of slope is larger than a predetermined value, for example, 5% (S106).

If the degree of slope is larger than the predetermined value in step S106, the actuator 15 supplies hydraulic pressure to the clutch elements and brake elements (S107) in order to minimize the distortion of the drive shaft by the thrust of the vehicle (108).

The hydraulic pressures supplied to the clutch elements and brake elements are determined according to the degree of slope, and for example, it can be determined from Table 1.

Therefore, the distortion of the drive shaft is suppressed by generating the drag on the parking gear shaft (S109) such that vibration noise is reduced by minimizing the accumulated energy when the parking mode is released.

The controller 14 performs as in Table 1 that provides the most effective drag on the parking gear shaft considering the many combinations of the clutch elements and brake elements, so that releasing torque of the parking mode is minimized.

For example, if the shift lever 102 is in the parking mode and the degree of slope is 5%, only 30% of the entire hydraulic pressure is exerted on the clutch elements and brake elements to generate drag.

The hydraulic pressure according to the degree of slope can be optimally determined by tuning appropriately.

Then, it is determined if the shift lever moves from the parking state to the parking mode release on the sloped road (S110).

If the parking mode release is detected in step S110, the controller 14 discharges the hydraulic pressure supplied to the clutch elements and brake elements through the actuator 15 (S111), and simultaneously operates the hydraulic pressure which combines with the shift speed selected by the shift lever (S112).

Figure 4:
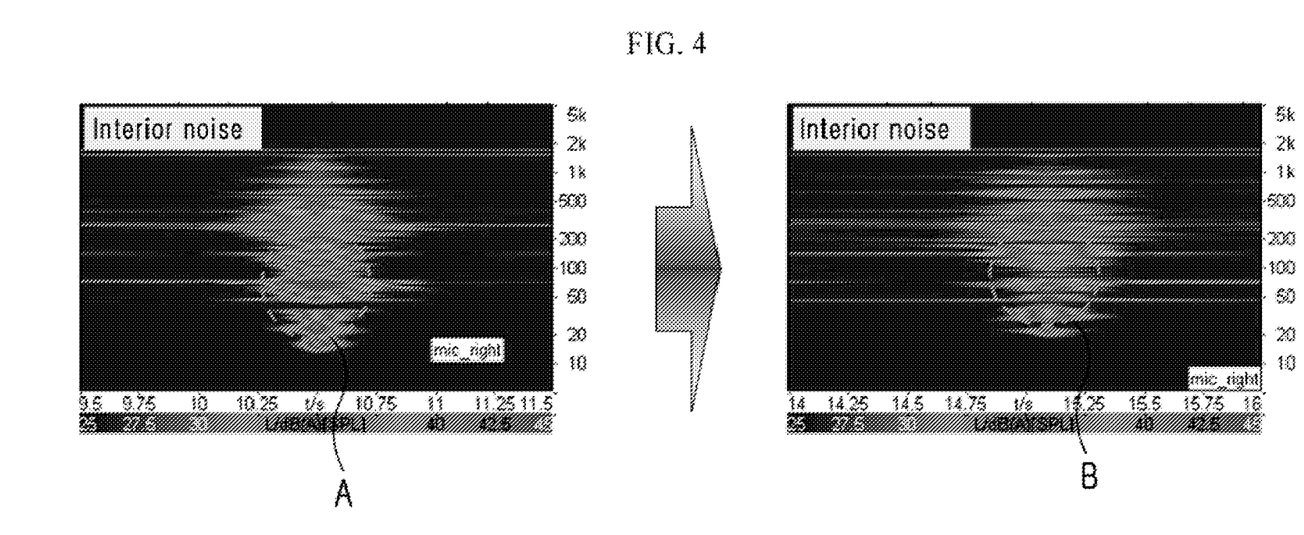
FIG. 4 shows measured results of interior noise when releasing a parking mode in an automatic transmission vehicle according to an exemplary embodiment of the present invention.

As described above, when a vehicle with an automatic transmission is parked on a sloped road, the drag is generated on the parking gear shaft in an exemplary embodiment of the present invention. As shown in FIG. 4, very strong interior noise occurs as at "A" in the parking mode release of a conventional vehicle, however interior noise such as at "B" occurs in a vehicle according to an exemplary embodiment of the present invention during parking mode release. That is, stability and reliability can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for parking control of an automatic transmission vehicle comprising:
   a speed detector that provides a controller with a vehicle speed;
   a shift lever detector that provides the controller with a position of a shift lever;
   a slope degree detector that provides the controller with a degree of slope of a sloped road;
   the controller that analyses the vehicle speed and the position of the shift lever, and supplies predetermined hydraulic pressures to brake elements and clutch elements in order to create drag on a parking gear shaft in conversion into a parking mode on the sloped road; and
   an actuator that supplies the hydraulic pressures to the clutch elements and the brake elements in the parking mode or discharges the hydraulic pressures from the clutch elements and the brake elements when the parking mode release is detected, according to the control of the controller;
   wherein the controller determines the hydraulic pressures of the clutch elements and brake elements that minimize interior noise when releasing the parking mode by applying drag map table information determined according to the degree of slope.

2. The apparatus of claim 1, wherein the controller analyses the degree of slope and supplies a predetermined hydraulic pressure to the brake elements and the clutch elements in case of parking mode conversion on the sloped road such that drag is generated on a parking gear shaft.

3. The apparatus of claim 2, wherein the controller supplies the predetermined hydraulic pressure to the brake elements and the clutch elements when the degree of slope is larger than a predetermined value.

4. A parking control method of an automatic transmission, comprising:
- detecting drive information including a vehicle speed and a position of a shift lever;
- preventing distortion of a drive shaft by generating drag on a parking gear shaft when the drive information shows a parking mode conversion on a sloped road; and
- releasing the drag generation of the parking gear shaft and combining a selected shift speed after a parking mode is released;
- wherein the drive information further includes a degree of slope, and the distortion of the drive shaft is prevented by generating drag on the parking gear shaft in the parking mode conversion on the sloped road when the degree of slope is larger than a predetermined value; and
- wherein the drag generation of the parking gear shaft is controlled by supplying a predetermined hydraulic pressure that is determined according to the degree of slope to clutch elements and brake elements.

5. The method of claim 4, wherein the hydraulic pressure is turned into a value to minimize torque according to a transmission when releasing the parking mode.

* * * * *